(12) United States Patent
Jung

(10) Patent No.: US 10,257,366 B2
(45) Date of Patent: Apr. 9, 2019

(54) METHOD, SYSTEM AND APPARATUS FOR MANAGING COMMUNICATION SESSIONS USING JOINT STORAGE

(71) Applicant: REDKNEE INC., Mississauga (CA)

(72) Inventor: Michael Jung, Berlin (DE)

(73) Assignee: REDKNEE INC., Mississauga (CA)

( * ) Notice: Subject to any disclaimer, the term of this patent is extended or adjusted under 35 U.S.C. 154(b) by 0 days.

(21) Appl. No.: 15/507,189

(22) PCT Filed: Oct. 10, 2014

(86) PCT No.: PCT/CA2014/000738
§ 371 (c)(1),
(2) Date: Feb. 27, 2017

(87) PCT Pub. No.: WO2016/054716
PCT Pub. Date: Apr. 14, 2016

(65) Prior Publication Data
US 2017/0244842 A1   Aug. 24, 2017

(51) Int. Cl.
| H04L 29/06 | (2006.01) |
| H04M 15/00 | (2006.01) |
| H04W 4/24 | (2018.01) |
| H04W 8/08 | (2009.01) |
| H04W 76/00 | (2018.01) |
| H04L 12/14 | (2006.01) |
| H04W 88/16 | (2009.01) |

(52) U.S. Cl.
CPC ........ *H04M 15/66* (2013.01); *H04L 12/1407* (2013.01); *H04L 65/1069* (2013.01); *H04M 15/8228* (2013.01); *H04W 4/24* (2013.01); *H04W 8/08* (2013.01); *H04W 76/00* (2013.01); *H04W 88/16* (2013.01)

(58) Field of Classification Search
CPC ..... H04M 15/66; H04L 65/1069; H04W 4/24; H04W 88/16
See application file for complete search history.

(56) References Cited

U.S. PATENT DOCUMENTS 9,369,291 B2 * 6/2016 Holm ................ H04L 41/0893
2009/0264096 A1 * 10/2009 Cai ..................... H04L 12/1403
455/406
2010/0185488 A1   7/2010 Hogan et al.
(Continued)

FOREIGN PATENT DOCUMENTS

WO   2014040652 A1   3/2014

OTHER PUBLICATIONS

International Search Report dated Jun. 9, 2015 for related International application No. PCT/CA2014/000738.
(Continued)

*Primary Examiner* — Qun Shen
(74) *Attorney, Agent, or Firm* — Perry + Currier Inc.

(57) ABSTRACT

According to embodiments described in the specification, a method, system and apparatus for managing communication sessions using joint storage. One of a policy server and a charging server, connected to each other via a core mobile network, stores a database containing both charging data and policy data. The other of the policy server and the charging server, rather than maintaining a distinct database, routes read and write operations to the server storing the database.

24 Claims, 6 Drawing Sheets

(56) References Cited

U.S. PATENT DOCUMENTS

| | | | |
|---|---|---|---|
| 2011/0188457 A1 | 8/2011 | Shu et al. | |
| 2012/0322406 A1* | 12/2012 | Cuervo | H04L 12/1407 455/408 |
| 2013/0132854 A1* | 5/2013 | Raleigh | G06F 3/0482 715/738 |
| 2013/0225122 A1* | 8/2013 | Kahn | H04L 12/1407 455/406 |
| 2014/0335815 A1* | 11/2014 | Ephraim | H04M 15/886 455/406 |
| 2015/0236863 A1* | 8/2015 | Castro Castro | H04L 12/1407 370/259 |

OTHER PUBLICATIONS

Written Opinion dated Jun. 9, 2015 for related International application No. PCT/CA2014/000738.

\* cited by examiner

METHOD, SYSTEM AND APPARATUS FOR MANAGING COMMUNICATION SESSIONS USING JOINT STORAGE

FIELD

The specification relates generally to cellular networks, and specifically to a method, system and apparatus for storing data used by multiple network elements in such networks.

BACKGROUND

In conventional core mobile networks, policy servers and charging servers share responsibilities regarding authorizing access to, monitoring usage of, and establishing usage constraints on, network resources. However, these servers generally maintain separate databases, sometimes hosted by third parties. This arrangement can result in inefficient communications between network entities, and can also result in reduced access to data for one or both of the charging server and the policy server.

SUMMARY

According to aspects of the specification, systems and methods are provided for managing communication sessions. One of a policy server and a charging server, connected to each other via a core mobile network, stores a database containing both charging data and policy data. The other of the policy server and the charging server, rather than maintaining a distinct database, routes read and write operations to the server storing the database.

BRIEF DESCRIPTIONS OF THE DRAWINGS

Embodiments are described with reference to the following figures, in which.

DETAILED DESCRIPTION OF THE EMBODIMENTS

Figure 1:
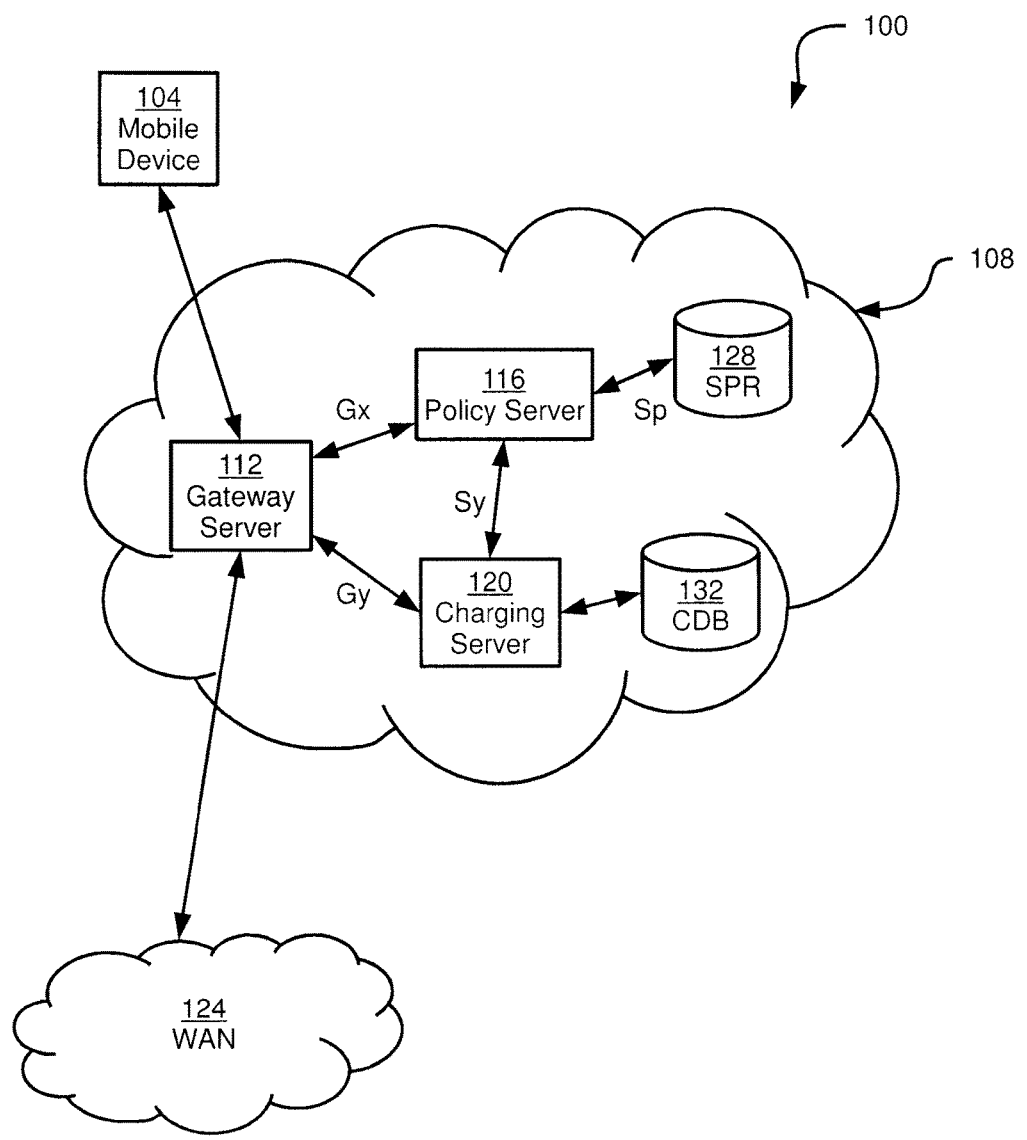
FIG. 1 depicts a communications system according to the prior art, according to a non-limiting embodiment.

FIG. 1 depicts a communications system 100 according to the prior art. System 100 includes a mobile device 104, such as a smart phone. Mobile device 104 is connected to a core mobile network 108. Core mobile network 108, also referred to herein as network 108, is an Evolved Packet Core (EPC) network structured according to the Long Term Evolution (LTE) standard set by the 3rd Generation Partnership Project (3GPP).

Network 108 includes a gateway server 112, a policy server 116, and a charging server 120. In the present example, in which core network 108 is the LTE core network, it will be apparent to those skilled in the art that gateway server 112 is also referred to as a Packet Data Network Gateway (PDN Gateway or P-GW); policy server 116 is also referred to as a Policy and Charging Rules Function (PCRF); and charging server 120 is also referred to as an Online Charging System (OCS). Various features of a P-GW, PCRF and OCS will be known to those skilled in the art from published 3GPP specifications, including 3GPP Technical Specification 23.203.

Other elements of core mobile network 108 (such as a Mobility Management Entity, MME, a Home Subscriber Server, HSS, and one or more Serving Gateways, S-GW) can be implemented conventionally, and are therefore not shown herein for simplicity.

In general, core mobile network 108 allows mobile device 104 to gain access to other networks, including a wide area network (WAN) 124 such as the Internet. To access WAN 124, mobile device 104 contacts gateway server 112 (via other network elements such as the MME and S-GW mentioned above). Gateway server 112, in turn, contacts policy server 116 over a communications link based on the known Gx interface (a variant of the Diameter protocol) to obtain policy and charging control rules to be applied to the communications between mobile device 104 and WAN 124. Policy server 116 generates such rules based on information received from gateway server 112, as well as information retrieved from a Subscriber Profile Repository (SPR) database 128. SPR 128 may be connected to profile server 128 via the Sp interface (see 3GPP Technical Specification 23.203). In some cases, policy server 116 may also receive information for use in rule generation from an application function (AF), not shown, residing in WAN 124, to which mobile device 104 has requested access.

Having generated the above-mentioned rules, policy server 116 provides the rules over the Gx interface to gateway server 112. Gateway server 112, in turn, enforces those rules during communications between mobile device 104 and WAN 124. The rules may specify the quality of service (QoS) parameters to which mobile device 104 is entitled (e.g. bandwidth and latency), usage limits, charging parameters and the like. During communications between mobile device 104 and WAN 124, gateway server 112 can provide usage data (e.g. what volume of data has been carried between mobile device 104 and WAN 124) to policy server 116 over the Gx interface, and to charging server 120 over the known Gy interface (another variant of the Diameter protocol).

Charging server 120 maintains a charging database (CDB) 132, in which the above-mentioned usage data from gateway server 112 is stored. CDB 132 also stores charging related information associated with mobile device 104, such as an account balance and rating information (e.g. how much mobile device 104 must pay for certain volumes of data, certain services, and the like). In addition, charging server 120 can determine monetary values for the usage data and deduct those values from the account in CDB 132 associated with mobile device 104. Charging server 120 can also track the usage data, the monetary values, or both, by updating counters in CDB 132.

Policy server 116 may be configured to generate or update the rules provided to gateway server 112 as mentioned above based on information stored in CDB 132. For example, policy server 116 may be configured to alter the bandwidth available to mobile device 104 once mobile device 104 has exchanged a volume of data exceeding a predetermined monetary cost with WAN 124. In such cases, policy server 116 requests that charging server 120 notify policy server 116 of the status of a cost counter maintained in CDB 132 (the "status" being an indication of whether the counter has exceeded one or more predetermined thresholds). Such requests are made over the known Sy interface (see 3GPP TS 29.219), which allows policy server 116 to request notifications from charging server 120, but does not allow policy server 116 to alter any values in CDB 132—that is, the Sy interface is read-only.

Charging server 120, upon receiving a request as mentioned above from policy server 116, records the request and transmits—for example whenever there is a change in the relevant counter's status—an indication of the counter's status over the Sy interface.

The above-mentioned system may suffer from certain disadvantages. For example, updating usage and charging rules for mobile device 104 may require administrative access to two separate databases (SPR 128 and CDB 132). More generally, SPR 128 and CDB 132 may have different architectures, thereby complicating their management. As a further example, installing charging server 120 in a system that previously did not have a charging server may require installing an entirely new database structure for CDB 132. Other disadvantages to system 100 may also occur to those skilled in the art.

Figure 2:
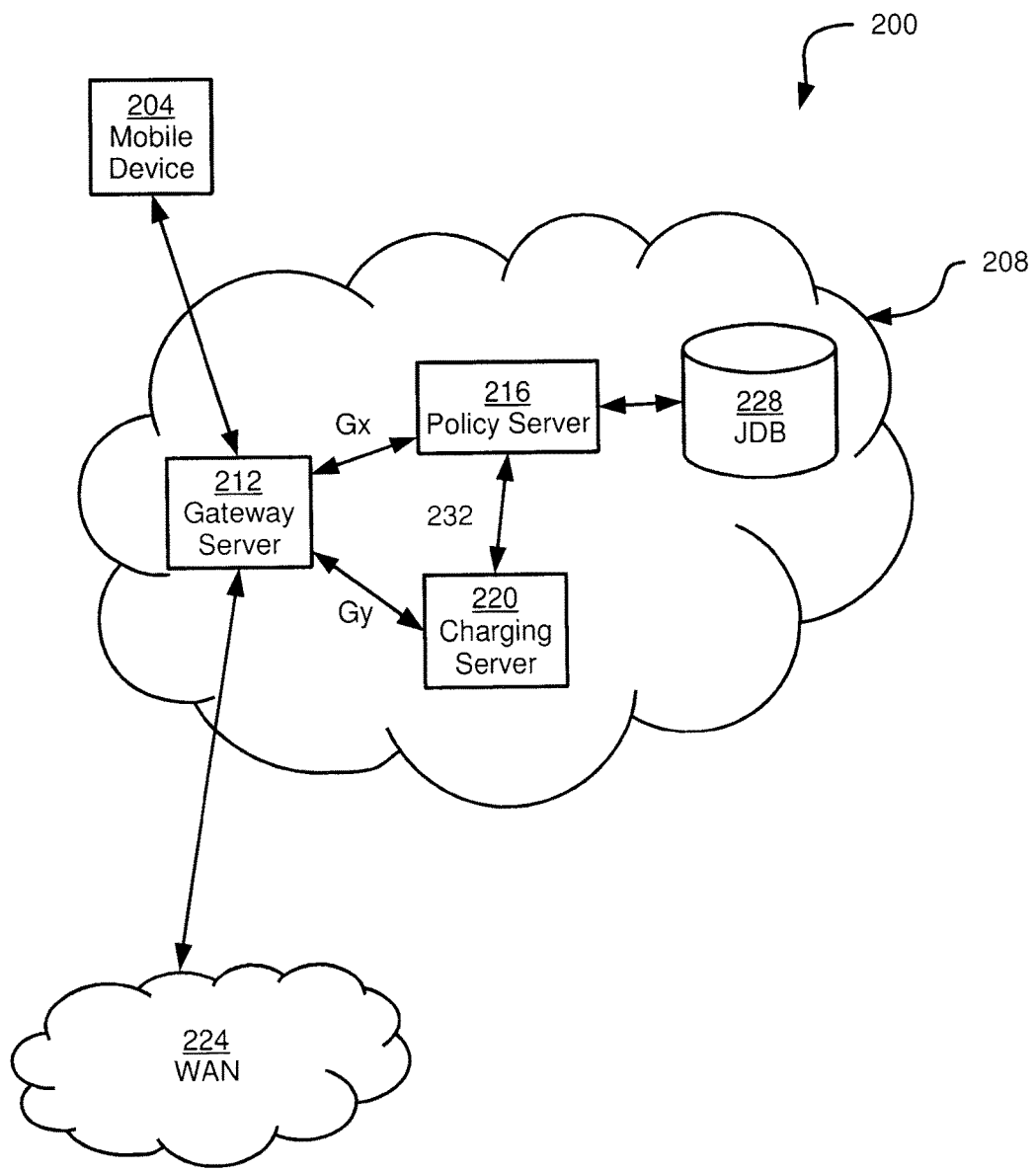
FIG. 2 depicts a communications system, according to a non-limiting embodiment.

Referring now to FIG. 2, a communications system 200 is illustrated which differs in various aspects from the system of FIG. 1. System 200 includes a mobile device 204, which can be any of a variety of mobile computing devices, including smart phones, cell phones, laptop computers and the like. Mobile device 204 thus comprises hardware elements including a processing unit, volatile and non-volatile memory, network interfaces, input devices and output devices (e.g. any suitable combination of displays, speakers, microphones, touch screens and the like). The processing unit of mobile device 204 executes programming instructions stored in memory (e.g. the above-mentioned non-volatile storage) for carrying out various functions, including the initiation of data communications over various networks. Multiple mobile devices may be included in system 200, but only mobile device 204 is shown for illustrative purposes.

Mobile device 204 can be connected to a core mobile network 208. Core mobile network 208, also referred to herein as network 208, can be based on any suitable standard or combination of standards. In the present example, network 108 is an Evolved Packet Core (EPC) network structured according to the Long Term Evolution (LTE) standard set by the 3rd Generation Partnership Project (3GPP). In other examples, however, network 208 can be structured according to a wide variety of other standards, such as the third Generation (3G) standard. The nature of the connection between mobile device 204 and core mobile network 208 is therefore variable, and is selected according to the implementation of core mobile network 208. In the present example, in which core mobile network 208 is an EPC network, the connection with mobile device 204 can be established through a conventional access network such as eNodeB.

Core mobile network 208 includes a gateway server 212, a policy server 216, and a charging server 220. In the present example, in which core network 208 is the LTE core network, gateway server 212 may also be referred to as a P-GW. Policy server 216 and charging server 220 may be referred to respectively as a PCRF and an OCS; however, it will be apparent to those skilled in the art that policy server 216 and charging server 220 include certain novel features that depart from those of the PCRF and OCS as defined by the 3GPP specifications.

Other elements of core mobile network 208 (such as a Mobility Management Entity, MME, a Home Subscriber Server, HSS, and one or more Serving Gateways, S-GW) can be implemented conventionally, and are therefore not shown herein for simplicity.

Gateway server 212 allows mobile device 204 to access other data networks, including a wide area network (WAN) 224, such as the Internet. To access WAN 224, mobile device 204 contacts gateway server 212 (via other network elements such as the MME and S-GW mentioned above). Gateway server 212, in turn, contacts policy server 216 over a Gx-based communications link to obtain policy and charging control rules to be applied to the communications between mobile device 204 and WAN 224. Policy server 216 is configured to generate rules and provide the rules to gateway server 212, which in turn is configured to provide usage data relating to the connection between mobile device 204 and WAN 224 to one or both of policy server 216 and charging server 220.

In system 200, in contrast to system 100, policy server 216 retrieves data for the above-mentioned rule generation from a joint database, or JDB 228 connected to policy server 216. In the present example, JDB 228 is stored in memory at policy server 216, rather than being hosted at a separate computing device accessible via network 208. Other implementations will also be discussed herein. In addition, the above-mentioned counters and account information employed by charging server 220 are stored not in a separate database at charging server 220, but rather in JDB 228. Charging server 220 and policy server 216 are connected by a communications link 232 based on a novel interface rather than the above-mentioned Sy interface. As will be described in detail below, policy server 216 and charging server 220 are configured to perform various actions to establish and manage communication sessions for mobile device 204 using JDB 228 and link 232 instead of separate databases and the Sy interface as in FIG. 1.

Before discussing the actions of policy server 216 and charging server 220 in detail, a brief description of the internal components of policy server 216 and charging server 220 will be provided.

Figure 3:
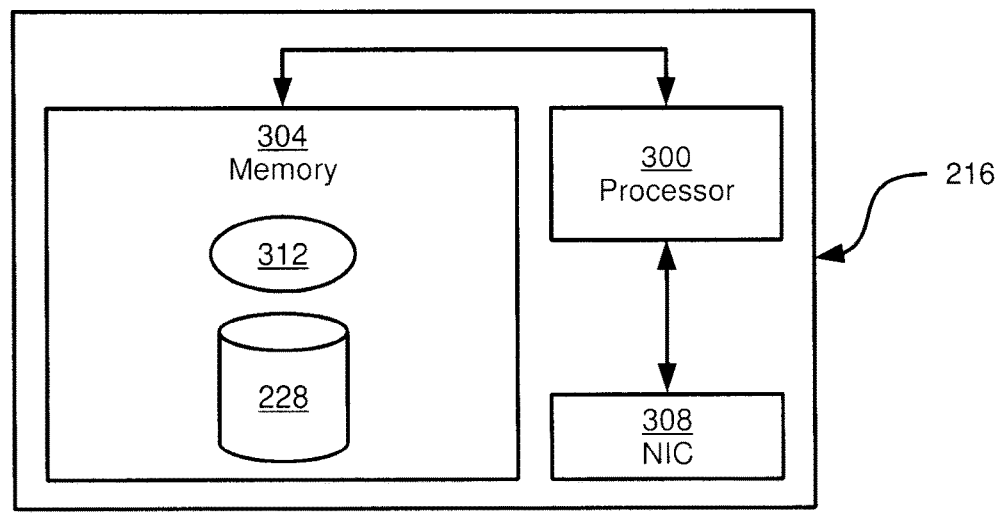
FIG. 3 depicts internal components of a policy server and a charging server, according to a non-limiting embodiment.
Figure 3:
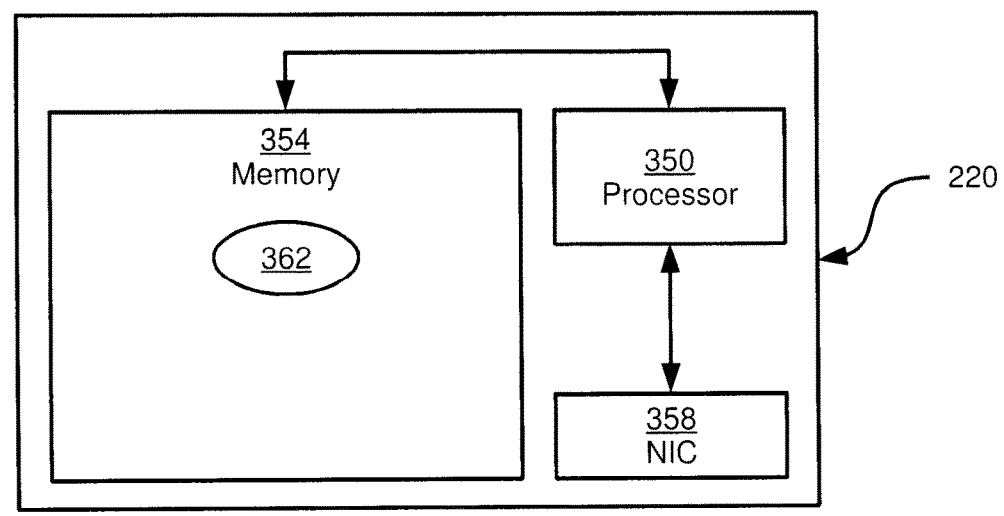

Turning to FIG. 3, policy server 216 and charging server 220 include respective central processing units (CPUs), or processors, 300 and 350. Processors 300 and 350 are interconnected with respective memories 304 and 354, as well as respective network interfaces 308 and 358. Processors 300, 350 and memories 304, 354 are generally comprised of one or more integrated circuits (ICs), and can have a variety of structures, as will now occur to those skilled in the art (for example, more than one CPU can be provided). Memories 304 and 354 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Network interfaces 308, 358 can be network interface controllers (NIC) that allow policy server 216 and charging server 220 to connect to each other and other computing devices (e.g. gateway server 212). Policy server 216 and charging server 220 can also each include input and output devices, such as keyboards, mice, displays, and the like (not shown).

Memories 304, 354 store a plurality of computer-readable programming instructions, executable by processors 300 and 350, respectively, in the form of various applications. As will be understood by those skilled in the art, processors 300 and 350 can execute the instructions of or more such applications in order to perform various actions defined within the instructions. In the description below, processors 300, 350 or more generally policy server 216 or charging server 220 are said to be "configured to" perform certain functions. It will be understood that they are so configured via the execution of the instructions of the applications stored in memories 304, 350.

Among the applications stored in memory 304 is a policy application 312, which is executable by processor 300 to perform various actions described herein. Memory 304, in the present example, also stores JDB 228. At charging server 220, meanwhile, a charging application 362 is stored in memory 354, and is executable by processor 350 to perform various actions described herein. In this example, because policy server 216 stores JDB 228, policy server 216 is referred to as the "primary" network entity among policy server 216 and charging server 220, while charging server 220 is referred to as the "secondary" network entity. Applications 312 and 362 configure policy server 216 and charging server 220, respectively, to perform various actions to make use of link 232 and JDB 228 to establish and manage communications sessions between mobile device 204 and WAN 224.

An example of the contents of JDB 228 is shown below in Table 1, which will be referred to in the following description of the actions taken by policy server 216 and charging server 220.

TABLE 1

Example Joint Database 228

| Device ID | 204 | ... |
|---|---|---|
| Monthly usage counter | 5 MB | ... |
| Session 1 usage counter | 0 MB | ... |
| Account balance | $15.40 | ... |
| Allowed Services | VoIP, web browsing | ... |
| Allowed Bandwidth | 10 Mbps | ... |
| Session 1 spending counter | 0$ | ... |
| Session 1 spending counter status | Low | ... |

In the above example, JDB 228 includes an identifier of device 204 (shown simply as "204" herein; it will be appreciated that the identifier can take various forms, including a MSISDN, a serial number, and the like). JDB 228 also includes a plurality of fields corresponding to mobile device 204, including both policy-related data and charging-related data (that is, data that is conventionally used by policy servers and data that is conventionally used by charging servers). For example, such fields can include a monthly usage counter containing the volume of data mobile device 204 has exchanged with WAN 224 in the previous month. JDB 228 may also contain at least one session-specific usage counter, containing the volume of data that mobile device 204 has exchanged with WAN 224 in a particular session (e.g. a single VoIP call). JDB 228 may contain multiple session-specific attributes, as mobile device 204 can initiate multiple communication sessions with WAN 224. Only one set of session-specific attributes is shown above for simplicity.

In addition, JDB 228 can include an account balance for a prepaid account associated with mobile device 204; an indication of which services within WAN 224 mobile device 204 is permitted to access; a maximum bandwidth available to mobile device 204; a session-specific spending counter containing the monetary value, as determined by charging server 220, of the data exchanged between mobile device 204 and WAN 224 in a particular communication session; and a status attribute for the above-mentioned monetary value counter. The status attribute can be determined by charging server 220, based on whether the spending counter has surpassed various predefined thresholds defined in application 362 (or, indeed, in other fields of JDB 228).

Other attributes are also contemplated, such as the priority to be accorded to data traffic associated with mobile device 204; volume allowances (for example, mobile device 204 may be permitted to exchange only 10 MB of data with WAN 224 each month, in addition to the service and bandwidth limits shown above).

Figure 4:
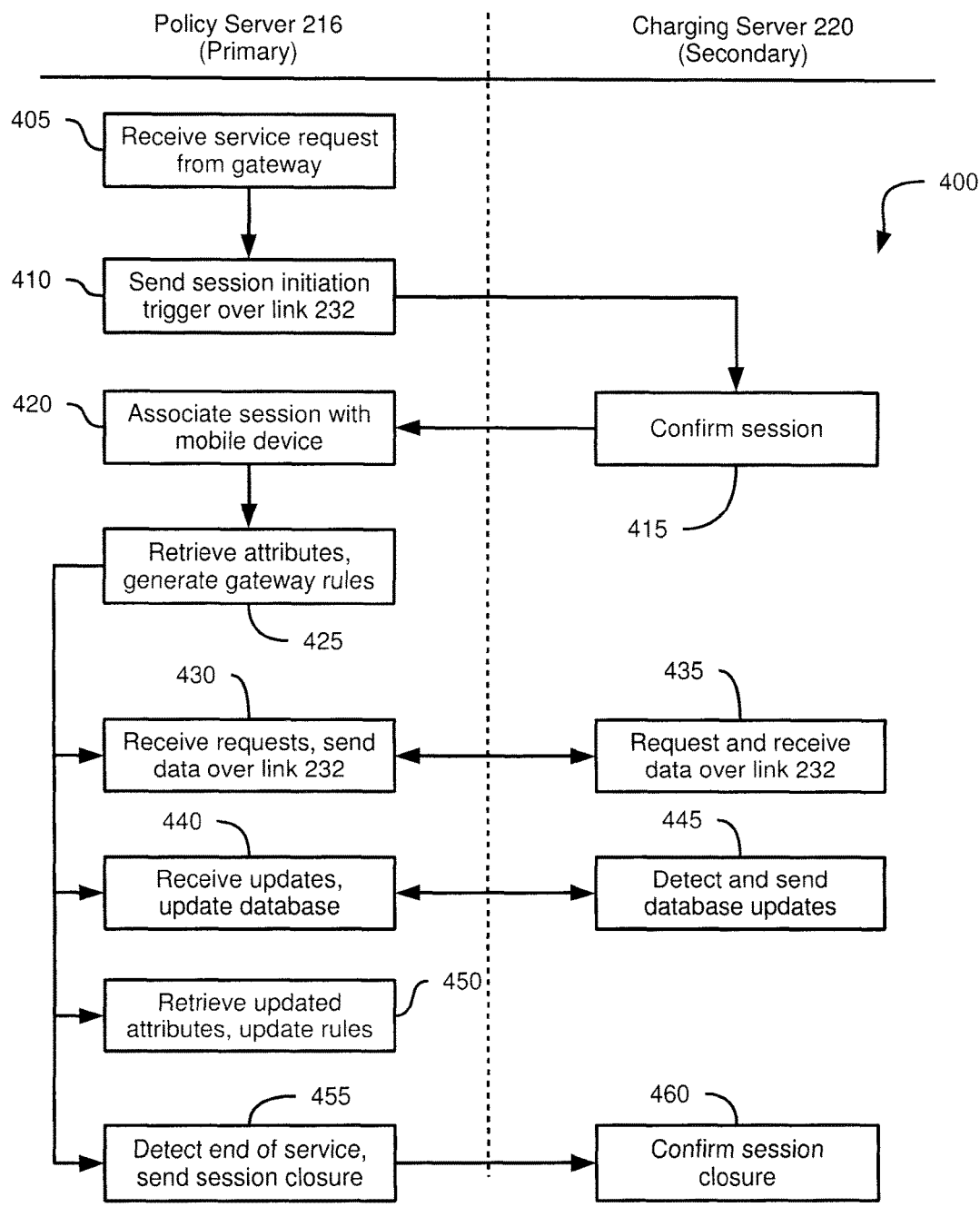
FIG. 4 depicts a method of managing communication sessions, according to a non-limiting embodiment.

Turning now to FIG. 4, a method 400 of managing communication sessions is illustrated. Method 400 will be described in conjunction with its performance on system 200, although it will be apparent to those skilled in the art that method 400 may also be performed on suitable variants of system 200.

Beginning at block 405, policy server 216 is configured to receive a service request associated with mobile device 204. The service request is generally received via network 108 from gateway server 212 (specifically, over the Gx interface). The service request can be generated by gateway server 212 in response to a request from mobile device 204 to access WAN 224, for example to establish a voice call or access a web page. Having received a request from mobile device 204, gateway server 212 can be configured to send the service request to policy server 216, including an identifier of mobile device 204 (e.g. a MSISDN) and an identifier of the requested service.

At block 410, in response to receiving the service request from gateway server 212, policy server 216 is configured to send a session initiation message over link 232 to charging server 220. The nature of the session initiation message is not particularly limited; in the present example, the message is a "trigger-only" message (that is, it does not contain data from JDB 228, but instead only contains session initiation parameters). The session initiation message can contain an identifier of mobile device 204, and can also contain further parameters defining the session between policy server 216 and charging server 220.

At block 415, in response to the session initiation message received from policy server 216 over link 232, charging server 220 is configured to return a message over link 232 confirming establishment of the session between policy server 216 and charging server 220. The session confirmation from charging server 220 may contain further session parameters. While a variety of session establishment mechanisms and session identifiers may be employed, it is contemplated that the session established at blocks 410 and 415 corresponds to a single mobile device, such as mobile device 204. As will be discussed below, multiple sessions over link 232 may correspond to mobile device 204, but a single session over link 232 generally does not correspond to more than one mobile device 204.

At block 420, policy server 216 is configured to receive the confirmation message from charging server 220, and to associate the session with mobile device 204. For example, the association may be made by binding the session established between policy server 216 and charging server 220 (the "interface-session") to the "user-session". The user-session is a communications session between policy server 216 and gateway server 212 (over the Gx interface) established in response to the initial service request from mobile device 204. Thus, at block 420, policy server 216 can be configured to store an identifier of the interface-session in correspondence with an identifier of the user-session. The session identifiers are not particularly limited, and can include any suitable combination of session parameters, examples of which will occur to those skilled in the art. In this example, a different interface-session is established for each user-session.

Various association implementations are contemplated for block 420. For example, policy server 216 can be configured to store an identifier of mobile device 204 rather than an identifier of the user-session in conjunction with the interface-session identifier. This permits policy server 216 to associate multiple user-sessions with a single interface-session rather than binding each user-session with an interface-session, since all user sessions for mobile device 204 contain the identifier of mobile device 204. In other words, in this arrangement, the interface-session may be used to carry data between policy server 216 and charging server 220 for a plurality of user-sessions each relating to a different service request by mobile device 204. The data carried over the interface-session can include values indicating which specific user-session the data relates to. It is also contemplated that in the second example above, policy server 216 can be configured to determine, in response to the request received at block 405, whether an interface session has already been established corresponding to mobile device 204 (even if it was established in response to a different service request). If the determination is affirmative, policy server 216 can be configured to skip blocks 410 and 420 (block 415 would therefore also be skipped) and instead use the existing interface session for the remaining blocks of method 400.

Proceeding to block 425, policy server 216 is configured to retrieve attributes from JDB 228 and generate rules for deployment to gateway server 212. The generation of rules at block 425 may be implemented according to conventional techniques, with the exception of the data source. Rather than contact an external database such as an SPR, policy server 216 is configured to retrieve the necessary attributes (such as allowed services, bandwidth limitations and like) from JDB 228 in memory 304.

Once the rules generated at block 425 have been deployed to gateway server 212, mobile device 204 can begin communicating with WAN 224 to obtain the service requested by mobile device 204 prior to block 405. During such communication, policy server 216 and charging server 220 can generally be configured to retrieve data from JDB 228 and to update data within JDB 228 based on the communications between mobile device 204 and WAN 224.

More specifically, at block 430 policy server 216 is configured to respond to requests transmitted by charging server 220 at block 435. The nature of the requests is not particularly limited. For example, charging server 220 can request that policy server 216 notify charging server 220 of any changes in an attribute (or multiple attributes) identified in the notification request. Policy server 216 is configured to store the notification request in memory 304. Subsequently, policy server 216 can be configured to determine, whether in response to an update to JDB 228 or at configurable time intervals, whether any of the attributes matching stored notification requests have changed. For example, charging server 220 can request that policy server 216 notify charging server 220 whenever a session-specific usage counter changes.

In other examples, instead of or in addition to notification requests, charging server 220 can send a query for at least one attribute to policy server 216, in response to which policy server 216 retrieves the requested attribute from JDB 228 and sends the requested attribute via link 232 to charging server 220. For example, charging server 220 can request the account balance shown in Table 1 above from policy server 216. As will now be apparent to those skilled in the art, the account balance may be required by charging server 220 in order to charge the account associated with mobile device 204 for data usage during the communications session between mobile device 204 and WAN 224.

In addition to providing data to charging server 220, policy server 216 can be configured to update JDB 228. At block 440, policy server 216 can be configured to receive update instructions sent by charging server 220 at block 445, containing an identifier of at least one attribute in JDB 228 and a new value for each identified attribute. For example charging server 220 can maintain a spending counter and a spending counter status in memory 354, and can periodically write the counter and counter status to JDB 228. The updates received at block 440 can also be received at policy server 216 from other network elements, such as gateway server 212. For example, the monthly usage counter shown in Table 1 may be updated based on data received from gateway server 212.

The provision of data from policy server 216 to charging server 220, and updates from charging server 220 to policy server 216, can include the identification of new data fields (that is, new attributes) for JDB 228. For example, charging server 220 can instruct policy server 216 to insert a new attribute into Table 1 as shown above (for example, to start a new spending counter).

In addition, at block 450 policy server 216 can be configured to retrieve data from JDB 228 and generate updated rules for gateway server 212, or determine whether updated rules are necessary. For example, policy server 216 can be configured to retrieve the spending counter status shown in Table 1 from JDB 228 (rather than requesting the spending counter status from charging server 220, as in conventional systems).

Blocks 450, 430 and 435, as well as 440 and 445, may be repeated any number of times and in any order during the communications between mobile device 204 and WAN 224. In addition, requests for notifications and update instructions (e.g. blocks 435 and 445) can be combined, as can the responses to such requests from policy server 216.

At block 455, policy server 216 is configured to detect that the user session has been terminated (e.g. that the communications between mobile device 204 and WAN 224 have ceased). In response, policy server 216 is configured to send a message to charging server 220 to close the interface-session. In embodiments in which associations are stored between multiple user-sessions and the interface-session, policy server 216 can first determine whether any other user-sessions for mobile device 204 exist, and if such sessions do exist, to skip block 455.

At block 460, charging server 220 can return a session closure confirmation message to policy server 216. The messages sent at blocks 455 and 460 can include further updates to JDB 228. For example, attributes specific to a particular user-session as shown in Table 1 can be deleted or reset to zero.

Figure 5:
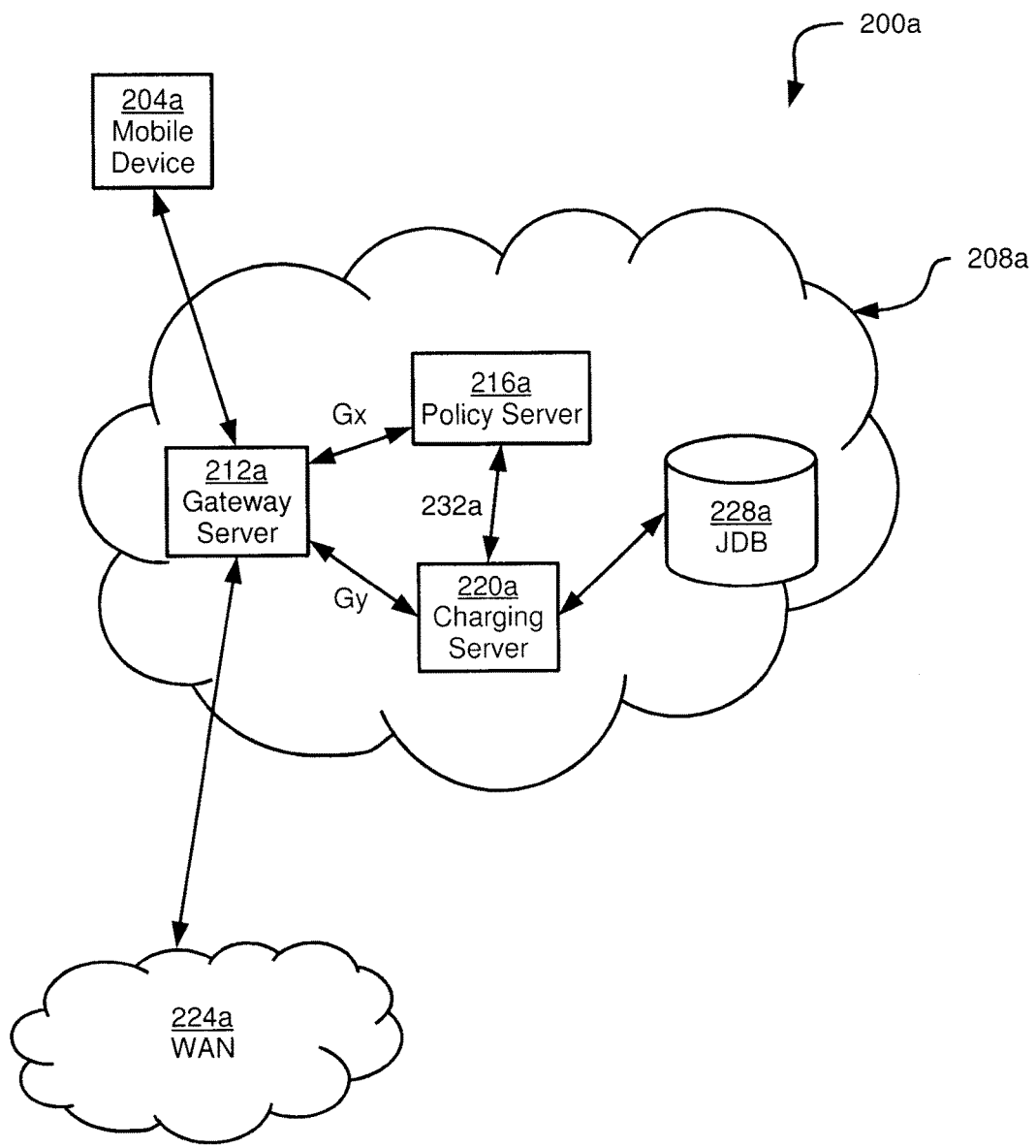
FIG. 5 depicts a communications system, according to another non-limiting embodiment.

Turning now to FIG. 5, a system 200a is shown according to another embodiment. System 200a includes a mobile device 204a and a network 208a including a gateway server 212a, a policy server 216a connected to a charging server 220a via a link 232a. System 200a also includes a joint database 228a and a WAN 224a. The components of system 200a are as described above in conjunction with the similarly-numbered components of system 200 (e.g. mobile device 204a is as described in connection with mobile device 204), with the exception that JDB 228a is stored at charging server 220a instead of policy server 216a. In other words, policy server 216a is the "secondary" network entity, while charging server 220a is the "primary" network entity.

Figure 6:
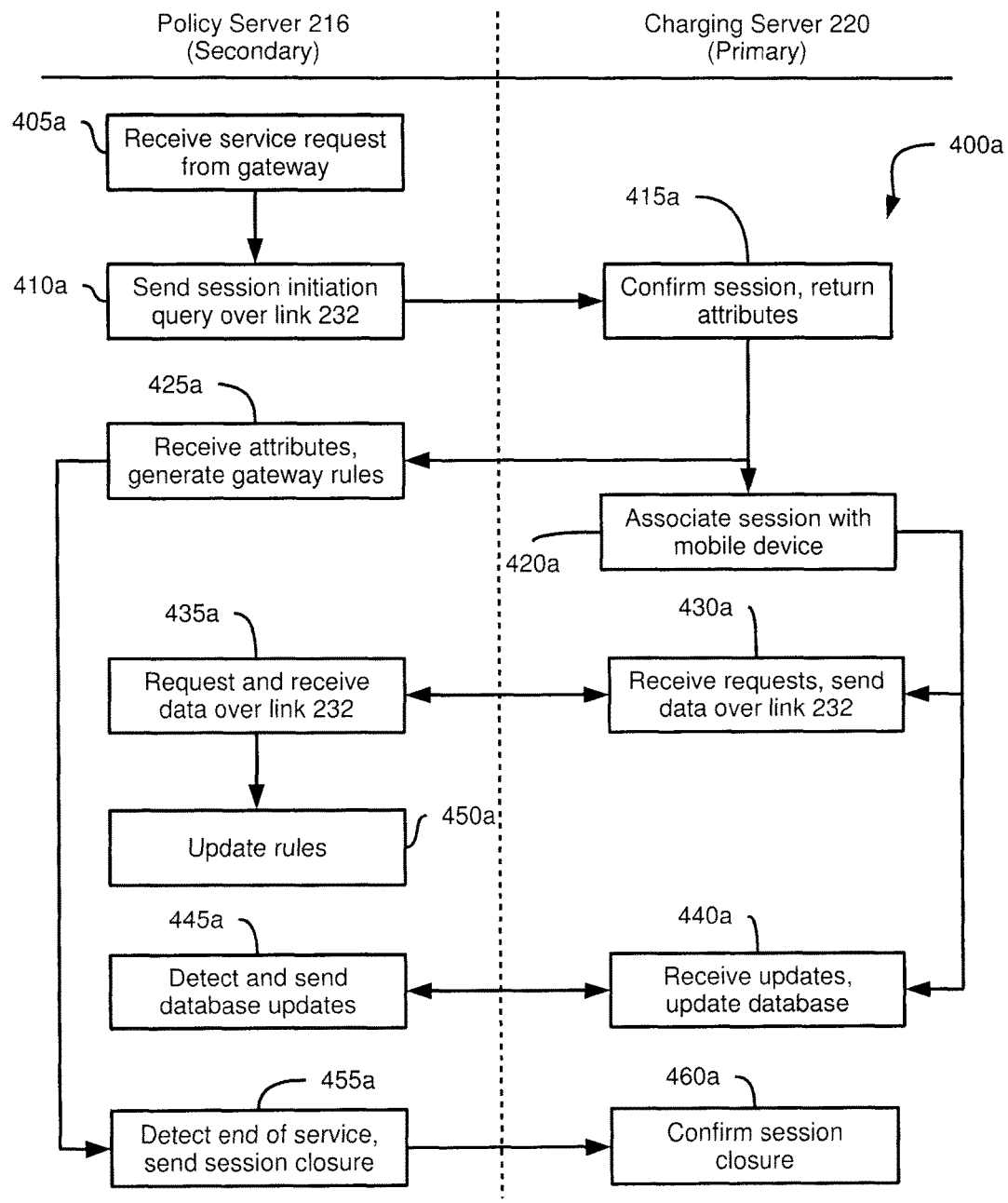
FIG. 6 depicts a method of managing communication sessions, according to another non-limiting embodiment.

Turning to FIG. 6, a method 400a is illustrated. In brief, method 400a is a version of method 400 adapted for performance in system 200a rather than system 200. The blocks of method 400a are as described above in connection with similarly-numbered blocks of method 400, except for the features discussed below.

At block 410a, rather than send a trigger-only session initiation to charging server 220a, policy server 216a is configured to send a session initiation query to charging server 220a. Because policy server 216a requires attributes from JDB 228a to allow the establishment of a session between mobile device 204a and WAN 224a, policy server 216a is configured to request those attributes from charging server 220a simultaneously with the establishment of an interface-session. At block 415a, therefore, charging server 220a is configured to confirm establishment of the session, and also return the requested attributes to policy server 216a via link 232a.

The association of the interface-session with mobile device 204a at block 420a is performed by charging server 220a rather than policy server 216a, because charging server 220a has direct control over JDB 228a. Thus, charging server 220a can, for example, bind a Gy session (the user-session between charging server 220a and gateway server 212a).

The performances of blocks 430a, 435a, 440a, and 445a are largely as described above, with the exception that blocks 430a and 440a are performed by charging server 220a, while blocks 435a and 445a are performed by policy server 216a. Block 450a, the updating of the rules generated at block 425a, is still performed by policy server 216a. It will be appreciated that charging server 220a may also conduct various actions by retrieving data from JDB 228a. For example, charging server 228a may allocate quotas to gateway server 212a, perform account balance checks, and the like.

Further, although policy server 216a does not host JDB 228a, policy server 216a still performs session closure at block 455a. Policy server 216a performs session initiation and closure because policy server 216a generally receives new session requests and terminations from gateway server 212a before charging server 220a.

In brief, therefore, rather than store separate databases, policy servers 216 and 216a, and charging servers 220 and 220a as described herein share a single joint database 228 or 228a. The primary network entity hosts JDB 228 or 228a and relays data to and from the secondary network entity, while the secondary network entity requests data and sends updates to the primary network entity. Therefore, JDB 228 or 228a can be deployed at whichever of the policy server and the charging server is expected to require the fastest access to JDB 228 or 228a.

The ability of systems 200 and 200a to share the same data model between charging and policy servers may allow for simpler deployment of either a policy server or a charging server in networks that previously lacked such network elements. Further, systems 200 and 200a may reduce the necessary network traffic associated with, for example, deploying new service packages.

Links 232 and 232a are read/write interfaces that can be based on any suitable technology. For example, an implementation of the Diameter protocol may be employed. In other embodiments, where policy servers and charging servers are implemented on the same hardware (e.g. in the same datacenter), an Inter-Process Communication (IPC) interface may be employed instead of a Diameter-based interface.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A system in a core mobile network, comprising:
   a gateway server;
   a charging server connected with the gateway server via a first communications protocol;
   a policy server connected to (i) the gateway server via a second communications protocol and (ii) the charging server via a third communications protocol; the policy server storing a joint policy and charging database containing policy data attributes and charging data attributes;
   the policy server configured, in response to a request for a service associated with a mobile device, to send a session initiation request to the charging server using the third communications protocol, for establishing an interface session with the charging server;
   the policy server configured to store an identifier of the interface session in association with an identifier of the mobile device;
   the policy server further configured to receive, via the third communications protocol, a request for one of the charging data attributes in the joint policy and charging database from the charging server responsive to detection of a charging event at the charging server, to retrieve the charging data attribute from the joint policy and charging database, and to send the charging data attribute to the charging server over the interface session using the third communications protocol; and
   the policy server further configured to detect a termination of the requested service and, in response, to send a session closure message to the charging server.

2. The system of claim 1, the policy server further configured to receive data from the charging server and to write the received data to the database.

3. The system of claim 2, the received data comprising at least one of a spending counter and a status for the spending counter.

4. The system of claim 3, the policy server further configured, responsive to receiving the request for a service, to retrieve the policy data from the database and generate at least one rule for transmission to a gateway server based on the policy data.

5. The system of claim 4, the policy server further configured to retrieve the spending counter status from the database, and to generate at least one updated rule for transmission to the gateway server.

6. The system of claim 1, wherein the policy server is connected to the charging server over a communications link having a read/write interface.

7. The system of claim 1, the policy server further configured to receive a notification request from the charging server identifying a further attribute; and in response to a subsequent update to the identified further attribute, to transmit the further attribute to the charging server.

8. A system in a core mobile network, comprising:
   a gateway server;
   a policy server connected with the gateway server via a first communications protocol;

a charging server connected to (i) the gateway server via a second communications protocol and (ii) the policy server via a third communications protocol; the charging server storing a joint policy and charging database containing policy data attributes and charging data attributes;

the charging server configured to receive a session initiation request from the policy server using the third communications protocol, for establishing an interface session with the policy server, the session initiation request sent by the policy server in response to a request for a service associated with a mobile device;

the charging server configured, in response to the session initiation request, to retrieve and send one or more of the policy data attributes to the policy server using the third communications protocol, for generation of at least one rule associated with the service request at the policy server;

the charging server configured to store an identifier of the interface session in association with an identifier of the mobile device;

the charging server further configured to receive a request for at least one of the policy data attributes and the charging data attributes in the joint policy and charging database from the policy server via the third communications interface, to retrieve the at least one attribute from the joint policy and charging database, and to send the at least one attribute to the policy server over the interface session using the third communications protocol; and the charging server further configured to receive a session closure message from the policy server and to terminate the interface session, the session closure message sent by the policy server in response to detecting termination of the requested service.

9. The system of claim 8, the charging server further configured to receive data from the policy server and to write the received data to the database.

10. The system of claim 9, the received data comprising a usage counter.

11. The system of claim 8, wherein the charging server is connected to the policy server over a communications link having a read/write interface.

12. The system of claim 8, the charging server further configured to receive a notification request from the policy server identifying a further attribute; and in response to a subsequent update to the identified further attribute, to transmit the further attribute to the policy server.

13. A method in a policy server connected to a charging server via a core mobile network, comprising:

establishing a connection with a gateway server via a first communications protocol;

storing a joint policy and charging database containing policy data attributes and charging data attributes in a memory of the policy server;

in response to a request for a service associated with a mobile device, sending a session initiation request from the policy server to the charging server via a second communications protocol distinct from a third communications protocol connecting the charging server with the gateway server, for establishing an interface session with the charging server;

storing an identifier of the interface session in the memory in association with an identifier of the mobile device;

receiving, via the third communications protocol, a request for one of the charging data attributes in the joint policy and charging database at the policy server from the charging server responsive to detection of a charging event at the charging server, and in response, retrieving the charging data attribute from the joint policy and charging database, and sending the charging data attribute to the charging server over the interface session using the second communications protocol; and detecting a termination of the requested service and, in response, sending a session closure message to the charging server.

14. The method of claim 13, further comprising: receiving data at the policy server from the charging server, and writing the received data to the database.

15. The method of claim 14, the received data comprising at least one of a spending counter and a status for the spending counter.

16. The method of claim 15, further comprising: responsive to receiving the request for a service, retrieving the policy data from the database and generating at least one rule for transmission to a gateway server based on the policy data.

17. The method of claim 16, further comprising: retrieving the spending counter status from the database, and generating at least one updated rule for transmission to the gateway server.

18. The method of claim 13, wherein the policy server is connected to the charging server over a communications link having a read/write interface.

19. The method of claim 13, further comprising: receiving a notification request from the charging server identifying a further attribute; and in response to a subsequent update to the identified further attribute, transmitting the further attribute to the charging server.

20. A method in a charging server connected to a policy server via a core mobile network, comprising:

establishing a connection with a gateway server via a first communications protocol;

storing a joint policy and charging database containing policy data attributes and charging data attributes in a memory of the charging server;

receiving a session initiation request at the charging server from the policy server via a second communications protocol distinct from a third communications protocol connecting the policy server with the gateway server, the session initiation request for establishing an interface session with the policy server, the session initiation request sent by the policy server in response to a request for a service associated with a mobile device;

in response to the session initiation request, retrieving and sending one or more of the policy data attributes to the policy server using the second communications interface, for generation of at least one rule associated with the service request at the policy server;

storing an identifier of the interface session in the memory in association with an identifier of the mobile device;

receiving a request for at least one of the policy data attributes and the charging data attributes in the joint policy and charging database from the policy server via the second communications interface, retrieving the at least one attribute from the joint policy and charging database, and sending the at least one attribute to the policy server over the interface session using the second communications interface; and receiving a session closure message from the policy server and terminating the interface session, the session closure message sent by the policy server in response to detecting termination of the requested service.

21. The method of claim 20, further comprising: receiving data from the policy server and to write the received data to the database.

22. The method of claim 21, the received data comprising a usage counter.

23. The method of claim 20, wherein the charging server is connected to the policy server over a communications link having a read/write interface.

24. The method of claim 20, further comprising: receiving a notification request from the policy server identifying a further attribute; and in response to a subsequent update to the identified further attribute, transmitting the further attribute to the policy server.

* * * * *